Dec. 3, 1940.    L. EDELMANN    2,223,483
THERMO HYDROMETER
Filed Dec. 2, 1937    2 Sheets-Sheet 1

Inventor
Leo Edelmann
By Lloyd W. Patch
Attorney

Inventor
Leo Edelmann
By Lloyd W. Patch
Attorney

Patented Dec. 3, 1940

2,223,483

UNITED STATES PATENT OFFICE 2,223,483

THERMO HYDROMETER

Leo Edelmann, Chicago, Ill.

Application December 2, 1937, Serial No. 177,810

22 Claims. (Cl. 265—46)

My invention relates to thermo hydrometers, and particularly to a thermo hydrometer of the syringe type, such as is used in testing radiator solutions, and other liquids and solutions in which the temperature may vary over a considerable range and the temperature of the quantity of liquid being tested must be ascertained to permit calculations of the correction necessary to be made with respect to readings taken by a float element, or other indicating means, calibrated at a fixed temperature.

An object of my invention is to provide a device of this character which has a liquid receiving and float barrel with an extension housing carried at the intake end thereof and has a thermometer encased within the extension housing to thus be protected from the liquid, and yet has a temperature responsive portion interposed to be influenced by the temperature of the test quantity of liquid being taken into the liquid and float barrel.

Another object is to so construct and arrange the parts that the test quantity of liquid is conducted from the inlet end directly to the liquid and float barrel, and the test liquid can be readily, conveniently and quickly taken into the instrument and emptied therefrom, without danger or possibility of any portion or part of the liquid coming in contact with or obscuring any indicating part of the thermometer or of the indicating portion of the float element.

A further object is to so construct the thermo hydrometer that the extension housing can be readily and quickly removed for assembling and disassembling the parts for cleaning or other purposes, without the necessity of disturbing the thermometer assembly.

Yet another purpose is to so construct and associate the parts of my improved thermo hydrometer that the indicating portions of the thermometer and of the float element, or specific gravity indicator, are in substantially vertical alignment, when the instrument is in use, thus necessitating only the raising or the lowering of the eye to quickly, clearly and accurately read the indications of temperature and of specific gravity.

With the above and other objects in view, which will be apparent to those skilled in the art, my invention includes certain novel features of construction and combinations and arrangements and associations and assembly of parts, which will be hereinafter more fully described in connection with the drawings and then particularly pointed out in the claims.

Figure 1:
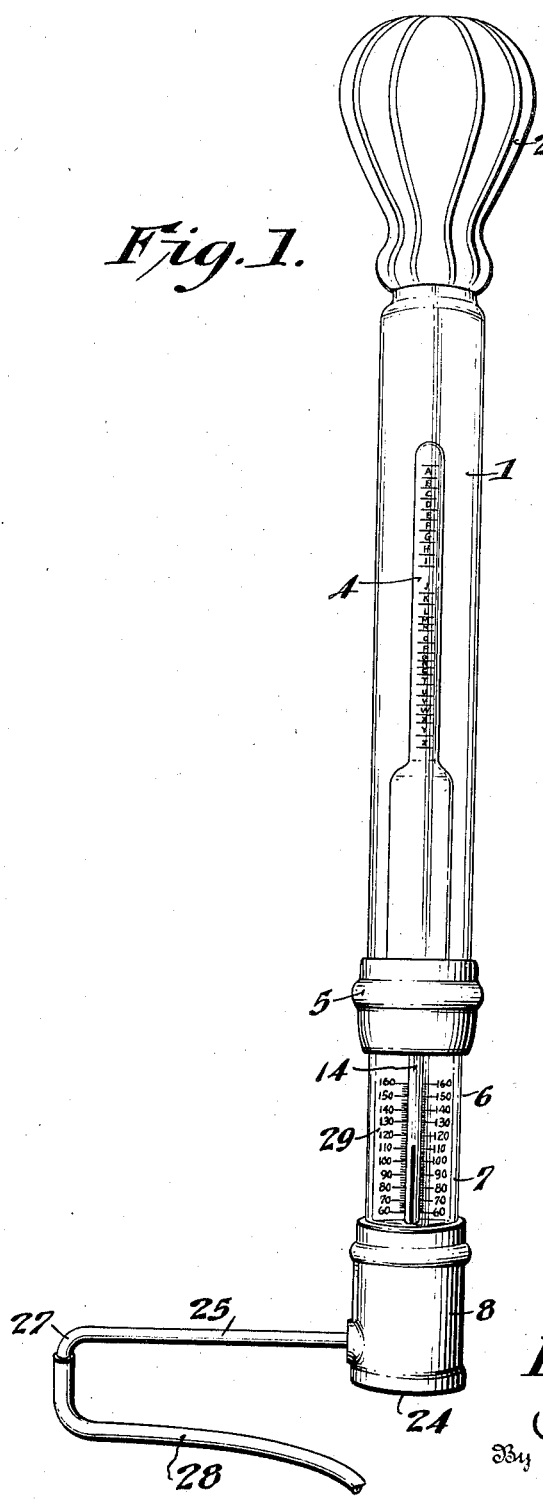
Figure 1 is a perspective view looking at the instrument from one side, as it will appear when in use.

The liquid and float barrel 1, which is of tubular transparent material, such as cylindrical tubular glass, is formed at one end to have a suction and compression bulb 2 connected therewith, and the other or intake end 3 is open.

A float element 4, of any desired type and form and construction, and having the indications thereof calibrated and shown and designated in any desired manner, is located within the liquid barrel 1.

A coupling member 5, of soft rubber or other suitable material, is fitted at the intake end 3 of the liquid and float barrel 1, and this coupling member is also fitted at one end of an extension housing 6, so that this extension housing is disposed substantially in axial alignment at the intake end of the barrel 1. The extension housing has a tubular transparent barrel portion 7, which is made of glass tubing or of any other suitable material, and which has the extension end member 8, of soft rubber or other suitable material, connected at its outer end. This extension end member 8 is provided with a liquid receiving chamber 9, and a lateral passage 10 leads through the sidewall of the member 8 to communicate with the bottom of the chamber 9.

Closure members or stoppers 11 and 12 are fitted at the ends of the transparent barrel 6, and the closure member 12 is provided with an opening 13 through which the tube 14 of a thermometer or other temperature influenced portion is fitted, the closure 11 being provided with a recess 15 to receive and hold one end of the tube. As stated, the tube 14 is passed through the opening 13 and a temperature influenced portion 16 of the thermometer is disposed and exposed within the liquid receiving chamber 9. The opening 13 and recess 15 are conveniently positioned substantially centrally within the stopper portions 11 and 12, and these stopper portions have openings 17 and 18 formed therethrough and spaced from the opening and recess 13 and 15. A liquid conducting tube 19 is fitted and held in these openings 17 and 18 to thus establish and provide a duct or passage through the barrel 7 and entirely out of communication with the middle portion of this barrel between the closures 11 and 12. It is perhaps preferable that grooves 20 and 21 be provided in the faces of the closure portions 11 and 12.

In the present instance I have shown the connecting member 5 as provided with sleeve portions to receive and to hold in liquid tight relation upon the beaded ends of the liquid barrel 1 and the housing barrel 7, and it may be found desirable to provide a partition wall 22 at the end of the liquid barrel to confine the float 5 therein. Where such a partition or stop wall is provided, an opening 23 is formed therethrough to establish free communication to the liquid conducting tube 19.

The extension end member 8, which is in effect the lower end portion of the extension housing generally indicated at 6, preferably has the lower end 24 thereof flattened or squared to permit the same to be rested and held upon a radiator shell, or any other convenient portion or structure, to thus support and steady the instrument with the two barrels in substantially perpendicular upright relation. The extension end member 8 is here illustrated as provided with a sleeve portion fitted in liquid tight association over the beaded lower end of the transparent extension barrel 7, but it will be appreciated that this manner of construction and association of the member 8 with the barrel 7, and also the manner of association and connection of the barrel 7 with the barrel 1, can be varied in various manners as now well known.

As stated, the extension end member 8 has a transverse passage 10 opening laterally and communicating at its inner end with the liquid receiving chamber 9, and this passage 10 is preferably curved upwardly at its inner end to open into the bottom of the chamber 9. An intake nozzle tube 25, which may be made of metal tubing, or of any other suitable material or tubing, has the end 26 thereof curved to follow the upwardly extending curve of the passage 10, so that the inner end of the tube 25 opens directly through the bottom of the liquid receiving chamber 9. At its outer end this nozzle tube 25 is bent or curved, as at 27, and a piece of rubber hose 28, or other flexible tubing, is carried by this bent end 27. Of course, the tube 25 and the tube 28 can be made as a unitary construction, and the tube 25 can be of hard rubber and the tube 28 of soft flexible rubber, or of other suitable materials. As the tube 25 is bent or curved at its end 26, and is fitted into a curved portion of the passage 10, this tube will at all times be assembled in proper relation, and the tube will be positively held against accidental or casual displacement. At the same time, the tube 25 can be readily and quickly removed when desired, and the tube can be just as conveniently and expeditiously inserted or fitted in place when the instrument is being assembled.

Figure 2:
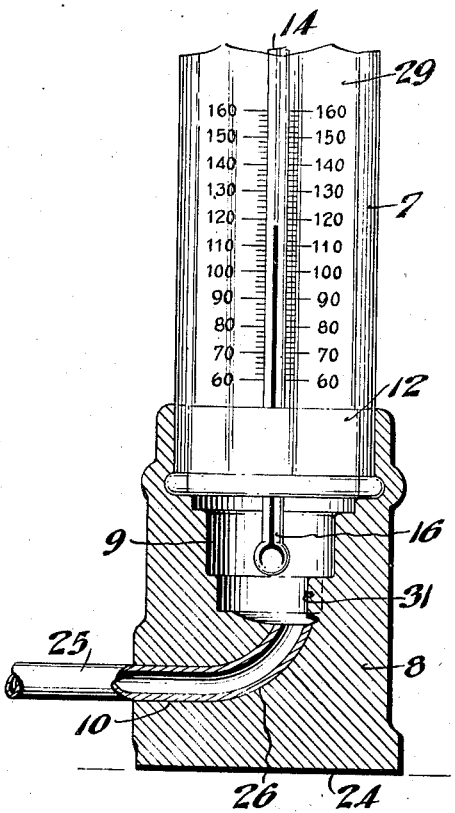
Fig. 2 is an enlarged fragmentary longitudinal sectional view through the lower part of the intake end of the instrument as shown in Figure 1.
Figure 3:
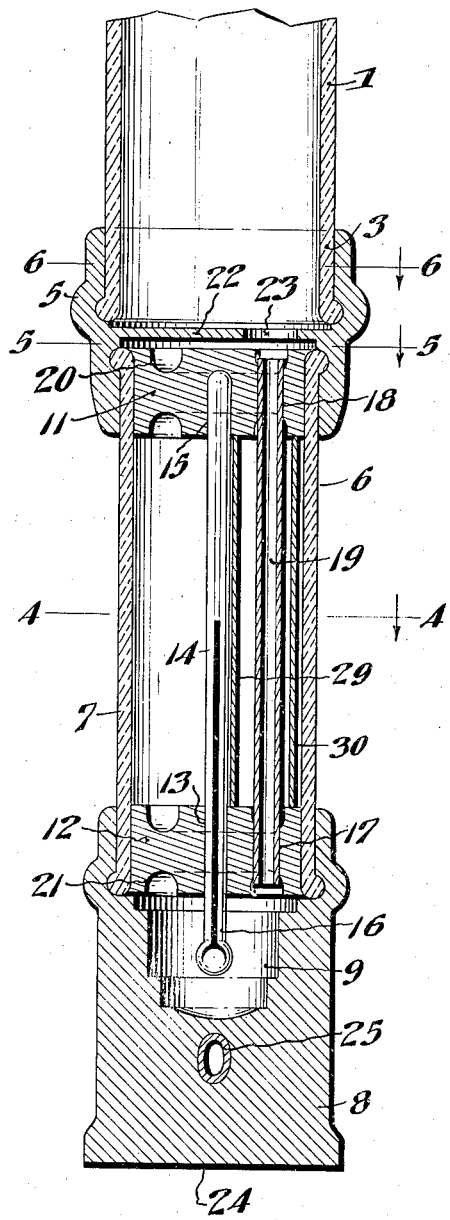
Fig. 3 is a fragmentary longitudinal sectional view taken substantially at right angles to the showing in Fig. 2, and illustrating the entire intake portion and assembly as this is associated with a liquid and float barrel.
Figure 4:
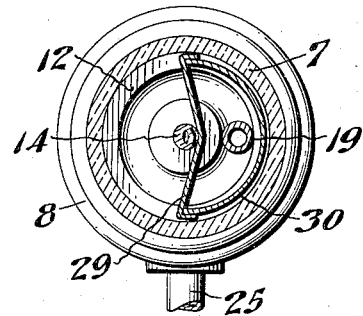
Fig. 4 is a transverse sectional view taken substantially on line 4—4 of Fig. 3.
Figure 5:
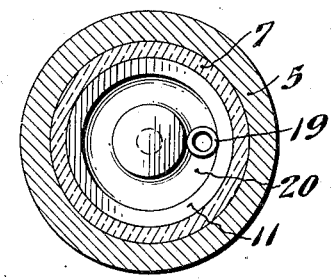
Fig. 5 is a transverse sectional view on line 5—5 of Fig. 3.
Figure 6:
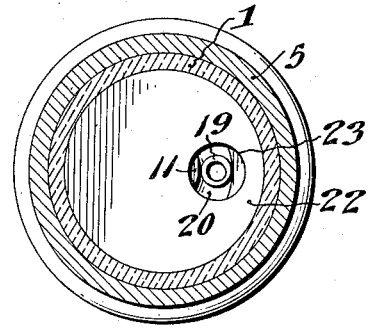
Fig. 6 is a transverse sectional view on line 6—6 of Fig. 3.

A thermometer scale sheet 29 is conveniently located within the glass barrel 7 of the extension housing 6, and as shown in Figs. 1 and 2, this scale sheet 29 can have degree indications and markings, or any other suitable indicia or data or divisions displayed thereon to thus be disposed and shown immediately adjacent to the indicating portion of tube 14 of the thermometer or temperature influenced means. A housing member 30 is conveniently associated and assembled with the temperature scale or temperature showing sheet 29, as illustrated in Fig. 4, and this housing member 30 closes around and shields the tube 19, and at the same time provides a smooth semi-cylindrical surface to receive and show printed matter, or any other indication or matter as desired.

With the parts constructed and associated as herein above set forth, the extension housing portion 6 has the closure members 11 and 12 associated with the transparent barrel 7, without thought of or necessity for removal or disassembly of these parts, and the thermometer 14, the tube 19, the thermometer scale sheet 29, and other portions within the transparent housing 7 are substantially sealed and permanently connected in place, and are protected against ingress of liquid or moisture from any source, and against collection of dirt or other matter that might in any way obscure a clear and free reading and view of parts within this barrel 7. Also, the extension end member 8 can be attached at the end of the transparent housing 7 with assurance that it need not be removed for cleaning or for any other operations or purposes encountered in normal use of the instrument. Likewise, the coupling member 5 can be attached to the end of the barrel 7 and the parts assembled therewith, without necessity for detachment of this coupling member.

As has been stated, the liquid and float barrel 1 can be attached at and associated with the coupling member 5 with the thought and purpose in mind that these parts can be readily detached for disassembly to permit more ready and convenient packing and shipment of the instrument, for the purpose of permitting the barrel to be cleaned when the instrument is in use, for placement and replacement of a float element, and for any and all purposes as desired. The nozzle tube 25 is also readily and quickly and conveniently removed and replaced as may be desired, and due to the fact that a protuberance or stop portion 31 is provided within the liquid receiving chamber 9, the tube 25 cannot have its curved end 26 inserted or pushed into or through the passage 10 a sufficient distance to contact with and damage the temperature influenced portion 16 of the temperature indicating means.

In the present instance I have shown the coupling member 5 and the extension end member 8 as being of relatively larger diameter than the glass barrel 7, and it will thus be seen that the glass barrel is substantially protected by these extending portions so that as the instrument is laid down upon a table, bench or the like, and is otherwise handled, the glass barrel will not readily come in contact with any portions or surfaces to thus be broken or cracked or damaged. As the tube 25 extends laterally from the extension end member 8, this tube will positively prevent and preclude the instrument rolling or otherwise moving when placed upon a table, even though the portions 8, 5 and 2 be substantially circular in cross section, and at the same time there are no protuberances or extensions which will in any way interfere with the free use and handling and storage or placement of the instrument in any place or location that may be desired.

With the thermo hydrometer constructed in the manner set forth, it is possible to completely assemble the extension housing portion, including the coupling member 5, the barrel 7, the extension end member 8, and all parts and portions intermediate and appurtenant thereto, the tube 25, the float element 4, and the liquid receiving barrel 1 can each be packed and handled separately, and the individual user can readily assemble these parts and can as conveniently disassemble the parts if and when this is desired. As the thermometer is entirely encased and liquid can flow only through the passage or duct of the tube 19, a free and open way is provided for liquid to be taken in the liquid receiving chamber or directly into the liquid barrel 1, but in this passage the test quantity of liquid must flow around and influence the portion 16 of the thermometer 14, or other temperature influenced structure, to show a quick and accurate reading of the temperature of the test quantity of liquid.

When the instrument is in use, the entire instrument can be rested with the end 24 of the member 8 upon a radiator shell, or upon any other convenient supporting structure, and the instrument then stands absolutely steady, which allows the liquid barrel 1 to be held and maintained in substantially perpendicular relation and permits a most accurate reading. Further, dirty and rusty or otherwise clouded radiator solution or other liquid being tested can never touch the face or any indicating portion of the thermometer or the scale sheet thereof. As the test quantity of liquid flowing to the liquid barrel 1 where the specific gravity reading will be taken by the float 4, must pass through the liquid receiving chamber 9, the thermometer is influenced to give a quick and accurate reading of the temperature of the liquid, so that substantially at the instant sufficient liquid is taken into the barrel 1 to influence the float 4, the temperature of the test quantity of liquid can be ascertained. As the barrel 1 is readily detached from the coupling member 5, the end 3 of this barrel is thus freely accessible to permit cleaning, to allow removal and replacement of the float, and for other purposes. With the coupling member 5 and the extension end member 8 formed in the manner shown and described and presenting a considerable mass of soft rubber or other cushion material, these parts will not only prevent actual contact of the glass barrels 1 and 7, but will at the same time cushion any shocks that may be encountered while the instrument is in use.

While I have herein shown and described only certain specific embodiments of my invention and have suggested only certain possible modifications, it will be appreciated that means can be associated with the instrument for suspending or hanging the same when not in use, that a correction scale carrying member can be employed and mounted in any desired manner, and that many and various changes in the form, construction, arrangement, mounting, assembly and association of the parts can be resorted to without departing from the spirit and scope of my invention.

I claim:

1. A thermo hydrometer comprising, a liquid barrel having a float element therein and having an intake end, a coupling member at the intake end of said barrel, suction means at the other end of said barrel, an extension housing connected at one end by said coupling member substantially in axial alignment with the barrel, a nozzle base member connected at the other end of said extension housing and provided with a liquid receiving chamber, means to seal said extension housing to exclude liquid therefrom, a thermometer mounted with its indicating portion within the housing and having a temperature influenced portion within the liquid receiving chamber, and a duct to conduct liquid through the sealed housing from said liquid receiving chamber to the liquid receiving barrel around and out of contact with indicating portions of the thermometer.

2. A thermo hydrometer comprising, a liquid receiving and float barrel having an intake end, a coupling member at the intake end of said barrel, a transparent thermometer barrel connected at one end by said coupling at the intake end of the liquid barrel and extending substantially in axial alignment therefrom, a thermometer having the indicating portions thereof within the transparent barrel and having a portion extending from the end thereof, means sealing the thermometer within the transparent barrel to thus house the indicating portions, an extension base member fitted at the other end of said transparent thermometer barrel having a liquid intake passage and provided with a liquid receiving chamber to hold liquid around the extending portion of the thermometer, and a tube leading through said sealed thermometer barrel to conduct liquid from said chamber to the liquid barrel.

3. A thermo hydrometer comprising, a liquid barrel having an intake end, a float in said barrel, means to draw liquid into said barrel, a coupling member at the intake end of said liquid barrel, a transparent thermometer barrel connected at one of its ends by said coupling at the intake end of the liquid barrel, closures for the ends of said transparent thermometer barrel, a thermometer held by said closures with its indicating portion housed and sealed within the transparent barrel and with a temperature influenced portion extending at the other end of the transparent barrel, an extension base member fitted at the said other end of said transparent thermometer barrel provided with a liquid receiving chamber around said temperature influenced portion of the thermometer and having a liquid intake leading to said liquid receiving chamber, and a tube extending through the closures and through the thermometer barrel to conduct liquid from said liquid receiving chamber to the liquid barrel.

4. A thermo hydrometer comprising, a liquid barrel having an intake end, a float in said barrel, means to draw liquid into said barrel, a coupling member at the intake end of said liquid barrel, a transparent thermometer barrel connected at one of its ends by said coupling at the intake end of the liquid barrel, closures for the ends of said transparent thermometer barrel, a thermometer held by said closures with its indicating portion housed and sealed within the transparent barrel and with a temperature influenced portion extending at the other end of the transparent barrel, an extension base member fitted at the said other end of said transparent thermometer barrel provided with a liquid receiving chamber around said temperature influenced portion of the thermometer and having a liquid intake leading to said liquid receiving chamber, a tube extending through the closures and through the thermometer barrel to conduct liquid from said liquid receiving chamber to the liquid barrel, and a thermometer scale sheet within said transparent barrel adjacent to the indicating portion of the thermometer.

5. A thermometer for a hydrometer comprising, a body structure having a tubular transparent portion, a pair of stopper portions fitted in liquid-tight spaced relation in said tubular transparent portion, a thermometer carried by said stopper portions with its indicating portion therebetween and a temperature influenced portion exposed outside, and a liquid conducting tube extending through the tubular transparent portion and between said stopper portions and opening at its ends on the outer sides of said stopper portions for thus conducting liquid through the transparent portion out of contact with the thermometer indicating portion.

6. A thermo hydrometer comprising a transparent body structure having a transparent thermometer housing portion adjacent one end, means to draw liquid into the body structure, spaced stopper portions fitted liquid-tight within the transparent thermometer housing portion, means providing a liquid conducting passage extending between the stopper portions and through the thermometer housing portion conducting liquid within the body structure from below the thermometer housing portion thereof through said housing portion to the body structure above said housing portion and leaving the space within the transparent thermometer housing portion of the body structure dry, and a thermometer carried by said stopper portions with an indicating portion in the dry space and a temperature responsive portion exposed to the liquid drawn into the body structure.

7. A thermo hydrometer comprising a liquid receiving and float barrel having an intake end, means to draw liquid into the barrel, a coupling member at the intake end of said barrel, a transparent extension housing through which liquid is drawn connected at one end to the barrel by said coupling member, liquid intake means at the opposite end of said extension housing, and temperature responsive means in said extension housing having an indicating portion visible through the transparent housing wall.

8. A thermo hydrometer comprising an elongated tubular transparent liquid receiving and float barrel having an intake end, means to draw liquid into said barrel, a coupling member at the intake end of the barrel, a tubular transparent extension housing through which liquid is drawn connected at one of its ends by said coupling at the intake end of the barrel, an end member connected at the opposite end of the extension housing, a liquid intake nozzle extending from the end member, and temperature responsive means in said extension housing having an indicating portion visible through the transparent housing wall.

9. A thermo hydrometer comprising an elongated tubular transparent liquid receiving and float barrel having an intake end, means to draw liquid into said barrel, a yieldable coupling member at the intake end of the barrel, a tubular transparent extension housing through which liquid is drawn connected at one of its ends by said yieldable coupling member at the intake end of the barrel, an end member fitted at and closing the opposite end of the housing and having a liquid passage leading into said housing, and temperature responsive means in said housing having an indicating portion visible through the transparent housing wall.

10. A thermo hydrometer comprising a transparent body structure, means to draw liquid into the body structure, spaced stopper portions fitted fluid-tight within the body structure, a liquid conducting passage portion extending between the stopper portions and opening on the outer sides thereof leaving dry the space within the body structure between said stopper portions and outside said passage and temperature responsive means carried by said stopper portions with an indicating portion in the dry space and a temperature influenced portion exposed to the liquid drawn into the body structure.

11. A thermo hydrometer comprising a transparent body structure, means to draw liquid into the body structure, stopper portions fitted fluid-tight in spaced relation within the body structure, a liquid conducting passage portion extending between the stopper portions and leaving the space around said passage portion and within the portion of said body structure between said stopper portions dry, a thermometer having an indicating portion in the dry space and a temperature influenced portion outside of said dry space and exposed to the liquid drawn into the body structure, and scale carrying means in the dry portion of the transparent thermometer housing portion of the body structure adjacent to the temperature indicating portion of the thermometer.

12. In a hydrometer, a transparent barrel for receiving the liquid to be tested, a float in said barrel, mounting means for a thermometer in said barrel near the lower end thereof comprising enlarged end portions spaced apart and having sealing engagement with the interior of the barrel, and an intermediate portion connecting said enlarged end portions and having a passage through which liquid can flow, said intermediate portion being of reduced size and cooperating with the inner wall of the barrel to define a dry chamber disposed between the enlarged end portions, and a thermometer in the barrel having a temperature indicating portion located in said dry chamber and a temperature responsive portion outside.

13. In a device of the class described, having a tubular transparent body and a float arranged for vertical movements therein, of a unit arranged to fit within said body below the float therein, said unit forming a fluid-tight partition in said body, temperature indicating means in said unit having the bulb element projecting beyond said unit for exposure to the fluid under test, and means providing a passage-way in said unit communicating with the upper and lower ends of said body forming means for the admission of a liquid therethrough to be indicated by the temperature indicating means.

14. In a device of the class described having a tubular transparent body and a float arranged for vertical movements therein, of a unit arranged within said body below the float therein and comprising spaced fluid-tight partition portions in said body, said unit comprising temperature indicating means and means providing a passage-way therein communicating with each end of the tubular transparent body, said passage-way forming means for conducting a liquid under test in close proximity with the temperature indicating means.

15. In a hydrometer of the character described, a hydrometer barrel, a thermometer having a recording stem and a bulb end thereon and being positioned within and at near the lower end portion of said barrel, and means providing a passage-way therearound permitting the flow of liquid therethrough into the barrel, and means for sealing the recording zone of said thermometer from contact with the liquid tested while permitting the bulb end thereof to be contacted thereby.

16. In a device of the class described, having a tubular transparent body and the usual gauge float arranged for vertical movements therein, of a temperature recording unit arranged to fit within said body below the float therein and forming spaced partitions in said body, said temperature recording unit comprising, a thermometer having a scale coacting therewith, means providing a passage-way for a liquid to be tested extending through said unit and in close proximity with the thermometer, and means at each end of the unit for sealing the same against contact with the liquid to be tested.

17. Temperature indicating means adapted for use in a hydrometer, comprising, a thermometer, partitioning means for supporting said thermometer substantially centrally of the body of the hydrometer at near one end thereof with the scale thereof between said partitioning means, and means providing a passage-way extending parallel with and in close proximity with the thermometer and communicating with the upper and lower ends of the hydrometer forming means for a liquid to be tested to pass said thermometer, while being drawn into the upper end of the hydrometer.

18. In a device of the class described, having a tubular transparent body and the usual gauge float arranged for vertical movements therein, of a temperature recording unit having spaced partitioning elements arranged to fit within said body below the float therein and to form a liquid-tight partition in said body, said temperature recording unit comprising a thermometer having a scale coacting therewith, and means providing a passage-way extending between said partitioning elements and communicating with the upper and lower ends of said tubular body forming means for the admission of a liquid therethrough from the lower portion of said body to the upper portion thereof to be indicated by the temperature recording means.

19. A temperature indicating means adapted to be positioned within the barrel of a hydrometer, comprising, a unit having spaced partitioning elements and a thermometer and scale therebetween, and a tubular member extending through said partitioning elements forming a passage-way through which a liquid drawn within the hydrometer may pass to the upper portion thereof, said passage-way being arranged to guide the liquid in close proximity with the thermometer to record the temperature thereof, the barrel of the hydrometer forming a shield to protect the thermometer from atmospheric changes.

20. A unit adapted to be positioned within a hydrometer, comprising spaced apart resilient upper and lower ends, a tubular portion extending between said spaced ends and opening at the outer sides thereof, and a thermometer having an indicating portion within the space between the upper and lower ends and outside of said tubular portion and having a temperature influenced portion exposed outside of said space.

21. A thermometer for hydrometers comprising a tubular transparent body portion, resilient upper and lower end portions disposed in spaced apart relation and liquid-tight fit within the transparent portion, a tubular liquid passage portion extending between said upper and lower end portions and opening on the outer sides thereof, and a thermometer having an indicating portion housed between said upper and lower ends and provided with a temperature influenced portion exposed outside of the space as defined by said ends and the tubular portion and the transparent portion.

22. In a hydrometer, a transparent body structure in which liquid is to be taken to be tested, a float in said transparent body structure, and means for indicating the temperature of liquid taken into said transparent body structure comprising a mounting for a thermometer, including spaced apart enlarged end portions fitted in fluid-tight engagement with the interior of the liquid receiving barrel and a liquid conducting passage portion of less diameter than the interior of the transparent body portion extending between said spaced apart end portions and establishing liquid passage communication from the outer side of one end portion to the outer side of the other end portion, said barrel and said end portions and said liquid conducting passage portion defining a fluid-tight dry chamber, and a thermometer having a temperature influenced portion exposed to the liquid to be tested and having an indicating portion housed within the fluid-tight dry chamber.

LEO EDELMANN.